United States Patent
Lin

(10) Patent No.: US 7,228,256 B2
(45) Date of Patent: Jun. 5, 2007

(54) METHOD AND SYSTEM FOR RECORDING A MONITORING LOG

(75) Inventor: Jia Yu Lin, Guangdong (CN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/378,034

(22) Filed: Mar. 16, 2006

(65) Prior Publication Data

US 2006/0247897 A1 Nov. 2, 2006

(30) Foreign Application Priority Data

Mar. 16, 2005 (CN) .................. 2005 1 0055510

(51) Int. Cl.
*G06F 11/00* (2006.01)
(52) U.S. Cl. ..................................... 702/188
(58) Field of Classification Search ............... 702/127, 702/188, 189; 719/313, 314
See application file for complete search history.

(56) References Cited

U.S. PATENT DOCUMENTS

| 7,051,121 B2 * | 5/2006 | Ohno et al. ............... 710/5 |
| 7,165,005 B2 * | 1/2007 | Steger et al. ............ 702/120 |
| 2005/0005237 A1 * | 1/2005 | Rail et al. ................. 715/530 |
| 2005/0164375 A1 * | 7/2005 | Inoue ................... 435/287.2 |

* cited by examiner

*Primary Examiner*—Michael Nghiem
(74) *Attorney, Agent, or Firm*—Schiff Hardin LLP

(57) ABSTRACT

The present invention concerns a method and system for recording a monitoring log for use in a magnetic resonant imaging system, wherein a log document is crated and is shared in an external storage device, timed queries are made to monitoring points on a monitored target by a timer and the data collected are periodically reported to a control module; and wherein the control module formats the reported data into a record format and writes the record formed into the shared log document. When the log document is not accessible, a buffer queue is opened automatically in an internal storage device to buffer the reported data, and when the access returns to normal, the records and the recorded data in the buffer queue are written as a supplement into the log document.

12 Claims, 1 Drawing Sheet

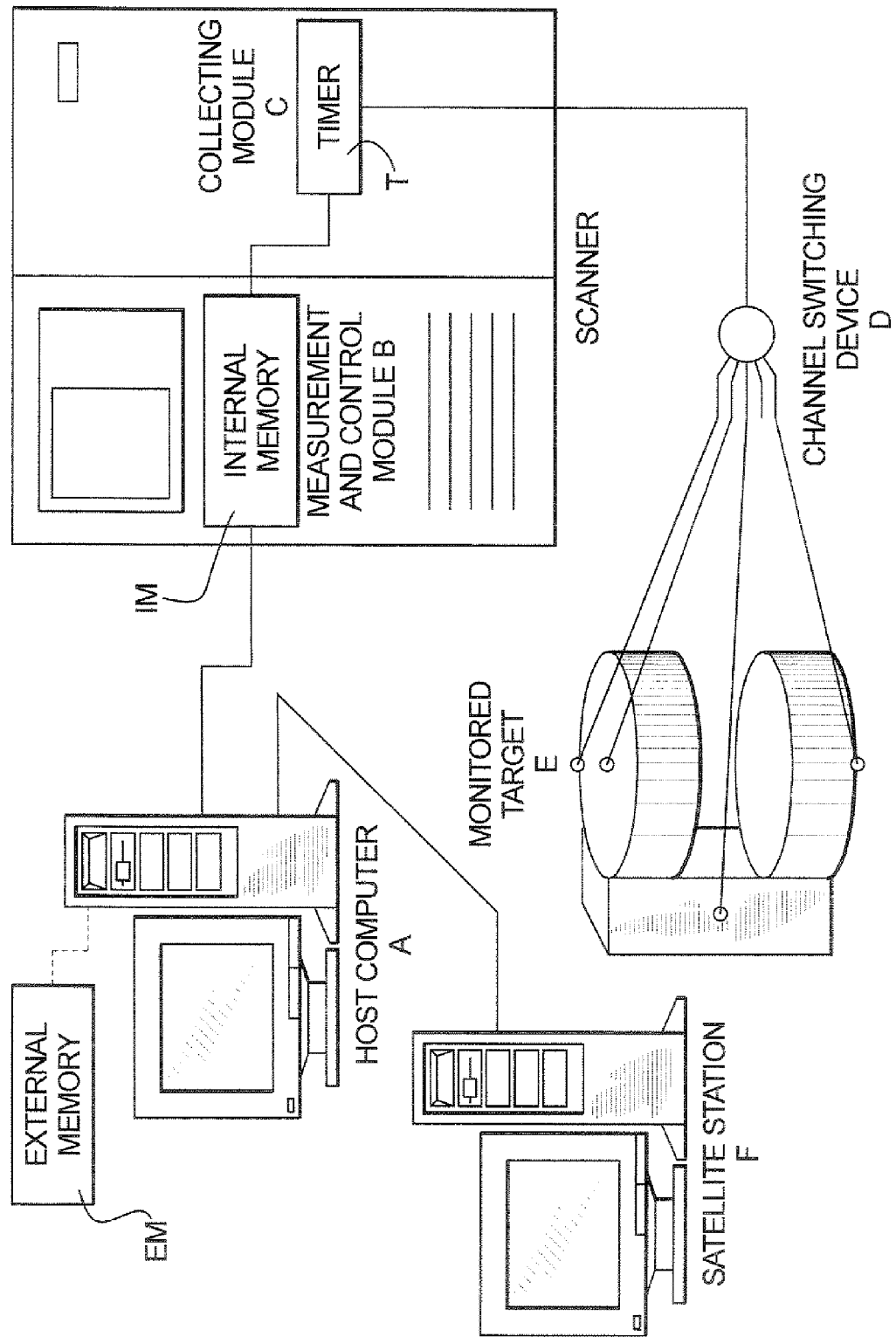

METHOD AND SYSTEM FOR RECORDING A MONITORING LOG

BACKGROUND OF THE INVENTION

1. Field of the Invention

This invention relates to a method and system for recording a monitoring log, and more particularly to a method and system for recording a monitoring log to achieve continuous monitoring in a magnetic resonant imaging system.

2. Description of the Prior Art

Current magnetic resonant imaging systems, usually require close monitoring of their magnets or other components. Due to their large volume and complicated configuration, magnetic resonant imaging systems usually are divided into many related modules and units, including a host computer.

Magnetic resonant imaging systems usually adopt a collecting module to undertake data collection, or use a collecting module connected with different transducers for collecting data, which are not connected directly to the host computer. Therefore, the monitored data are transferred through the collecting module, then to a measurement and control module, and finally to the host computer. In a system with such a distribution, the monitored data are sent upward level by level.

In known systems for monitoring data of magnet parameters:

multi-channel monitoring parameters are collected from a monitored target (i.e., the magnet or magnet system). These data are supported through a switching device and then a collecting module to form data in a certain format, and they are reported to a measurement and control module, which module sends the data to the host computer via a communication network.

The above conventional technique has the following drawbacks:

(1) the distance of the communication network from the host computer to the measurement and control module is relatively long, is prone to failures, and during a failure period the collected data cannot be monitored;

(2) from time to time the network needs to be interrupted for maintenance and tests, and during a maintenance and test period the collected data cannot be monitored;

(3) due to the needs of scanning operation, the communication network between the measurement and control module and the collecting module c can only communicate intermittently, and during the non-communicating periods the collected data cannot be monitored; and (4) since the system has many communication nodes, monitoring is performed only when querying is activated, so monitoring cannot occur.

SUMMARY OF THE INVENTION

An object of the present invention is to provide a method and system for recording a monitoring log that allow continuous monitoring.

Another object of the present invention is to provide a method and system for recording a monitoring log that make rational utilization of communication node resources.

Another object of the present invention is to provide a method and system for recording a monitoring log with high reliability.

Another object of the present invention is to provide a method and system for recording a monitoring log which does not need to wait for user progress when making queries.

Another object of the present invention is to provide a method and system for recording a monitoring log for a host computer's localized monitoring and data querying.

The above objects are achieved in accordance with the invention by providing a system for recording a monitoring log having at least a host computer, a measurement and control module, a collecting module, a channel switching device and a monitored target, wherein a scanner formed by the measurement and control module and the collecting module collects, via the channel switching device, data from the monitored target, which data are sent to the host compute, and wherein the host computer has an external storage device, the measurement and control module has an internal storage device, and the collecting module has a timer. A part of the storage space in the external storage device of the host computer is opened to set up a log document so that the measurement and control module can perform read and write operations to the log document as a shared document. The timer of the collecting module makes timed queries in turn to the instrument channel of each of monitoring points on the monitored target and reports the collected data periodically to the measurement and control module. The measurement and control module formats the reported data into a report format and writes the report into the shared log document of the host computer if and when there is communication failure between the measurement and control module and the host computer, and the measurement and control module automatically opens a buffer queue in its internal storage device to buffer the data reported by the collecting module. When the communication returns to normal, the records and reported data in the buffer queue are written as a supplement into the log document of the host computer.

The above object also is achieved in accordance with the invention by a method for recording a monitoring log including the steps of establishing and sharing a log document in an external storage device; making timed queries in turn to monitoring points on a monitored target by a timer and reporting periodically collected data to a control module, formatting, by said control module, the reported data into a record format and writing the reported data into the shared log document, and if when said log document is not accessible, a buffer queue is opened automatically in an internal storage device to buffer the reported data, and when the access returns to normal, the records and the recorded data in the buffer queue are written as a supplement into the log document.

This invention's advantages are:

(1) achieving continuous monitoring to the data;
(2) making rational utilization of communication node resources;
(3) high reliability;
(4) no need to wait for user progress when making a query; and
(5) the host computer's localized monitoring and data querying.

DESCRIPTION OF THE DRAWINGS

The single FIGURE is an illustrative diagram of the network structure of a system for performing monitored logging according to the invention.

DESCRIPTION OF THE PREFERRED EMBODIMENTS

The method and system for recording a monitoring log according to this invention can be used in the system shown in the FIGURE, in which a scanner formed by a measurement and control module B and a collecting module C collect data from a monitored target E via a channel switching device D, and send the data to a host computer A. The host computer A has or has access to an external storage device, such as an external memory EM, the measurement and control module B has a central processing unit operable at a relatively fast computing speed and an internal storage device, such as an internal memory IM, and the collecting module C has a timer.

The working principles of the method and system for recording a monitoring log according to this invention are:
 (1) Make use of the host computer's external storage device EM of the host computer A because the host computer A has a relatively large external storage space, open a part of the storage space to set up a log document, and perform read and write operations to the log document by the measurement and control module B in a document sharing manner.
 (2) Make use of the timer T of the collecting module C to make timed queries in turn to the instrument channel of each of the monitoring points on the monitored target E, and report the collected data periodically. During a scanning period, the collecting module C automatically pauses (stands by) and no data are reported during this period.
 (3) Make use of the internal storage resources of the internal memory IM and computing speed of the measurement and control module B, because the measurement and control module B has relatively more volatile memory and a central processing unit of a relatively fast computing speed. The collected individual data are formatted in the measurement and control module B into a recording format and are written into the log document shared with the host computer A via the communication network x. If and when the communication network x has a failure or is interrupted for maintenance, the measurement and control module B automatically opens a buffer queue to buffer the data reported by the collecting module C, and when the communication network returns to normal, the records and reported data in the buffer queue are written as a supplement into the log document of said host computer A.

It can be seen from the above description of the principles, that the method and system for recording a monitoring log according to this invention has the following advantages:
 (1) Achieving continuous monitoring of the data: by sharing the log document with the host computer A, the measurement and control module B can, by way of buffering, write the collected data into the log document for monitoring even under the conditions of failure in the communication network x or interruption due to maintenance.
 (2) Making rational utilization of communication node resources: using respectively the external storage device in the host computer A to set up and share the log document, and using the internal storage device and the central processing unit in the measurement and control module B as a buffer for the collected data and to write them or write them as a supplement into the log document of the host computer A.
 (3) High reliability: even under the conditions of failure in the communication network x or interruption due to maintenance, the collected data will not get lost and can be written into the log document as a supplement.
 (4) No need to wait for user progress when making a query: The host computer A only provides the document for sharing with minimal system expenses, and the host computer A does not need to initiate any query, therefore there is no need to wait for user progress.
 (5) Localized monitoring and data querying of the host computer A: all the current and historical monitoring data are written into and stored in the local external storage device of the host computer A, therefore localized monitoring and querying can be performed.

Furthermore, the host computer A can be connected with a number of satellite stations F, and makes data mapping to the satellite stations via a sharing mechanism for them to access the log document.

As a practical embodiment, the method and system for recording a monitoring log according to this invention can be used in a magnetic resonance imaging device.

In this embodiment, the measurement and control module B in FIG. 1 can be a measurement physical control unit (MPCU), the collecting module C can be a modularized temperature unit (MTU), and the channel switching device D can be a temperature regulator (TCU-Regulator).

The multi-channel temperature regulator D is connected to the modularized temperature unit C; the modularized temperature unit C communicates with the multi-channel temperature regulator D via a RS-485 bus; and the measurement physical control unit B communicates with the modularized temperature unit C via a CAN bus. The measurement physical control unit B makes operations to the external storage device of the mapping host computer A, and decides whether to buffer the records automatically according to the status of the network.

Although modifications and changes may be suggested by those skilled in the art, it is the intention of the inventor to embody within the patent warranted hereon all changes and modifications as reasonably and properly come within the scope of the inventor's contribution to the art.

I claim as my invention:

1. A recording system for a monitoring log comprising:
 a host computer;
 a measurement and control module in data communication with the host computer;
 a collecting module in data communication with the measurement and control module;
 a channel switching device adapted to obtain data from a monitored target, said monitored target being a magnetic resonance system for entry into a monitoring log, said channel switching device being in data communication with said collecting module;
 said measurement and control module and said collecting module forming a scanner that scans and collects, via said channel switching device, said data from said magnetic resonance system, and said measurement and control module communicating the collected data to said host computer;
 said host computer having access to an external storage device, and said measurement and control module comprising an internal storage device, and said collecting module comprising a timer;
 a portion of storage space in said external storage device being reserved for a log document, as said monitoring log, and said measurement and control module performing reading and writing operations relative to said log document, as a shared log document with said host computer;

said timer of said collecting module making timed inquiries to monitoring points at said magnetic, resonance system via respective channels of said channel switching device and periodically reporting data, selected from the group consisting of system parameters and component statuses of said magnetic resonance system collected from said monitoring points to said measurement and control module, as reported data; and said measurement and control module formatting said reported data into a report format and writing said reported data in said report format into the shared log document through said host computer, and if said measurement and control module temporarily cannot communicate with said host computer, said measurement and control module automatically opening a buffer queue in said internal storage device and buffering said reported data in said report format and, when said measurement and control module thereafter is able to communicate with said host computer, said measurement and control module automatically writing the reported data in said report format, currently in said buffer queue, into said log document, as a supplement, through said host computer.

2. A recording system as claimed in claim 1 wherein said collecting module, during scanning and collection of said data from said magnetic resonance system, operates said timer to automatically pause said timer, with no data being collected and reported from said magnetic resonance system while said timer is paused.

3. A recording system as claimed in claim 1 comprising a satellite station in communication with said host computer, said host computer providing access to said log document by said satellite station via said host computer.

4. A method for electronically recording a monitoring log, comprising the steps of:

in an external storage device accessible by a host computer, establishing a log document accessible to a user via said host computer;

making a plurality of timed queries to respective monitoring points of a monitored target, said monitored target being a magnetic resonance system through a timer operated by a control module, thereby obtaining collected data, selected from the group consisting of system parameters and component statuses of said magnetic resonance system, and periodically electronically reporting said collected data to said control module;

making said log document accessible to said control module via said host computer, as a shared log document and, in said control module, formatting said collected data into report data in a report format, and writing said report data in said report format from said control module into the shared log document through said host computer; and if said log document is not accessible through said host computer by said control module, in said control module automatically opening a buffer queue in an internal memory of said control module and buffering said reported data in said report format, and when said control module subsequently obtains access to said shared log document through said host computer, said control module automatically writing the reported data in said report format in said buffer queue into said shared log document, as a supplement.

5. A method as claimed in claim 4 comprising embodying said external storage device in said host computer.

6. A method as claimed in claim 4 comprising providing a communication connection between said host computer and a satellite station, and making said shared log document in said external storage device accessible to said satellite station via said host computer.

7. A method as claimed in claim 4 comprising embodying said timer in a collecting module in communication with said control module magnetic and with said magnetic resonance system.

8. A method as claimed in claim 7 comprising, while said collecting module is collecting data from said monitored target, pausing said timer automatically and, while said timer is paused, not collecting data from said monitored target.

9. A recording system for a monitoring log comprising:
a host computer;
a measurement and control module in data communication with the host computer;
a collecting module in data communication with the measurement and control module;
a channel switching device adapted to obtain data from a monitored target for entry into a monitoring log, said channel switching device being in data communication with said collecting module;
said measurement and control module and said collecting module forming a scanner that scans and collects, via said channel switching device, said data from said monitored target, and said measurement and control module communicating the collected data to said host computer;
said host computer having access to an external storage device, and said measurement and control module comprising an internal storage device, and said collecting module comprising a timer;
a portion of storage space in said external storage device being reserved for a log document, as said monitoring log, and said measurement and control module performing reading and writing operations relative to said log document, as a shared log document with said host computer;
said timer of said collecting module making timed inquiries to monitoring points at said monitored target via respective channels of said channel switching device and periodically reporting data collected from said monitoring points to said measurement and control module, as reported data, said collecting module, during scanning and collection of said data from said monitored target, operating said timer to automatically pause said timer, with no data being collected and reported from said monitored target while said timer is paused; and
said measurement and control module formatting said reported data into a report format and writing said reported data in said report format into the shared log document through said host computer, and if said measurement and control module temporarily cannot communicate with said host computer, said measurement and control module automatically opening a buffer queue in said internal storage device and buffering said reported data in said report format and, when said measurement and control module thereafter is able to communicate with said host computer, said measurement and control module automatically writing the reported data in said report format, currently in said buffer queue, into said log document, as a supplement, through said host computer.

10. A recording system for a monitoring log comprising:
a host computer;
a measurement and control module in data communication with the host computer;
a collecting module in data communication with the measurement and control module;
a channel switching device adapted to obtain data from a monitored target for entry into a monitoring log, said channel switching device being in data communication with said collecting module;
said measurement and control module and said collecting module forming a scanner that scans and collects, via said channel switching device, said data from said monitored target, and said measurement and control module communicating the collected data to said host computer;
said host computer having access to an external storage device, and said measurement and control module comprising an internal storage device, and said collecting module comprising a timer;
a portion of storage space in said external storage device being reserved for a log document, as said monitoring log, and said measurement and control module performing reading and writing operations relative to said log document, as a shared log document with said host computer;
said timer of said collecting module making timed inquiries to monitoring points at said monitored target via respective channels of said channel switching device and periodically reporting data collected from said monitoring points to said measurement and control module, as reported data;
said measurement and control module formatting said reported data into a report format and writing said reported data in said report format into the shared log document through said host computer, and if said measurement and control module temporarily cannot communicate with said host computer, said measurement and control module automatically opening a buffer queue in said internal storage device and buffering said reported data in said report format and, when said measurement and control module thereafter is able to communicate with said host computer, said measurement and control module automatically writing the reported data in said report format, currently in said buffer queue, into said log document, as a supplement, through said host computer; and
a satellite station in communication with said host computer, said host computer providing access to said shared log document by said satellite station via said host computer.

11. A method for electronically recording a monitoring log, comprising the steps of:
in an external storage device accessibly by a host computer, establishing a log document accessible to a user via said host computer;
making a plurality of timed queries to respective monitoring points of a monitored target through a timer operated by a control module, thereby obtaining collected data, and periodically electronically reporting said collected data to a control module;
making said log document accessible to said control module via said host computer, as a shared log document and, in said control module, formatting said collected data into report data in a report format, and writing said report data in said report format from said control module into the shared log document through said host computer;
if said log document is not accessible through said host computer by said control module, in said control module automatically opening a buffer queue in an internal memory of said control module and buffering said reported data in said report format, and when said control module subsequently obtains access to said shared log document through said host computer, said control module automatically writing the reported data in said report format in said buffer queue into said shared log document, as a supplement; and
providing a communication connection between said host computer and a satellite station, and making said shared log document in said external storage device accessible to said satellite station via said host computer.

12. A method for electronically recording a monitoring log, comprising the steps of:
in an external storage device accessibly by a host computer, establishing a log document accessible to a user via said host computer;
making a plurality of timed queries to respective monitoring points of a monitored target through a timer operated by a control module, thereby obtaining collected data, and periodically electronically reporting said collected data to a control module;
making said log document accessible to said control module via said host computer, as a shared log document and, in said control module, formatting said collected data into report data in a report format, and writing said report data in said report format from said control module into the shared log document through said host computer;
if said log document is not accessible through said host computer by said control module, in said control module automatically opening a buffer queue in an internal memory of said control module and buffering said reported data in said report format, and when said control module subsequently obtains access to said shared log document through said host computer, said control module automatically writing the reported data in said report format in said buffer queue into said shared log document, as a supplement; and
embodying said timer in a collecting module in communication with said control module and with said monitored target and, while said collecting module is collecting data from said monitored target, pausing said timer automatically and, while said timer is paused, not collecting data from said monitored target.

* * * * *